United States Patent
Brodie et al.

(10) Patent No.: US 9,690,553 B1
(45) Date of Patent: Jun. 27, 2017

(54) IDENTIFYING SOFTWARE DEPENDENCY RELATIONSHIPS

(71) Applicant: INTERNATIONAL BUSINESS MACHINES CORPORATION, Armonk, NY (US)

(72) Inventors: Aharon Brodie, Tel Aviv (IL); Eitan D. Farchi, Parades Hana (IL); Michael E. Gildein, II, Wappingers Falls, NY (US); Sergey Novikov, Holon (IL); Richard D. Prewitt, Jr., Centre Hall, PA (US); Orna Raz-Pelleg, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/275,607

(22) Filed: Sep. 26, 2016

(51) Int. Cl.
*G06F 9/45* (2006.01)
(52) U.S. Cl.
CPC ..................... *G06F 8/433* (2013.01)
(58) Field of Classification Search
CPC ........................................................ G06F 8/433
USPC ................................................. 717/124–167
See application file for complete search history.

(56) References Cited

U.S. PATENT DOCUMENTS

| | | | | |
|---|---|---|---|---|
| 5,107,418 A * | 4/1992 | Cramer | ..................... | G06F 8/41 711/E12.006 |
| 6,907,599 B1 * | 6/2005 | Kashai | ................... | G06F 17/504 716/103 |
| 7,414,626 B1 * | 8/2008 | Picott | .................... | G06T 11/206 345/440 |
| 8,327,325 B2 | 12/2012 | Chung et al. | | |
| 8,387,001 B2 | 2/2013 | Sindhgatta et al. | | |
| 8,495,100 B2 | 7/2013 | Cheung | | |
| 8,584,108 B2 | 11/2013 | Sukumaran et al. | | |
| 8,595,186 B1 * | 11/2013 | Mandyam | ................. | G06F 8/38 707/632 |
| 9,201,757 B2 | 12/2015 | Menghrajani et al. | | |
| 2005/0114842 A1 * | 5/2005 | Fleehart | .............. | G06F 11/3608 717/126 |

(Continued)

OTHER PUBLICATIONS

Feldman, Stuart I. "Make—A program for maintaining computer programs." Software: Practice and experience 9.4 (1979): pp. 255-265.*

(Continued)

*Primary Examiner* — Satish Rampuria
(74) *Attorney, Agent, or Firm* — Cantor Colburn; Steven Chiu (57) ABSTRACT

Embodiments include method, systems and computer program products for identifying dependency relationships in a software product. Aspects include obtaining change history data for the software product and extracting a plurality of change elements from the change history data, each change element including an identifier of a code segment that was changed and a timestamp of the change. Aspects also include creating a dependency graph based on the plurality of change elements, wherein the dependency graph includes nodes that correspond to the code segments and edges that connect nodes that were both updated in a same logical grouping, calculating a weight for each of the edges based on probability that the nodes connected by the edge will be updated together, and outputting the dependency graph.

18 Claims, 7 Drawing Sheets

(56) References Cited

U.S. PATENT DOCUMENTS

| | | | | |
|---|---|---|---|---|
| 2009/0133006 A1* | 5/2009 | Cheung | ............ | G06F 8/71 717/144 |
| 2009/0187822 A1* | 7/2009 | Abreu | ............ | G06F 8/61 715/700 |
| 2010/0100867 A1* | 4/2010 | Sindhgatta | ............ | G06F 8/75 717/105 |
| 2015/0007154 A1* | 1/2015 | Bharadwaj | ............ | G06F 9/06 717/160 |

OTHER PUBLICATIONS

Zicari, Roberto. "A framework for schema updates in an object-oriented database system." Data Engineering, 1991. Proceedings. Seventh International Conference on. IEEE, 1991. pp. 2-13.*

Gruschke, Boris. "Integrated event management: Event correlation using dependency graphs." Proceedings of the 9th IFIP/IEEE International Workshop on Distributed Systems: Operations & Management (DSOM 98). 1998.pp. 1-12.*

Hedeker, Donald, and Robert D. Gibbons. "Mixor: a computer program for mixed-effects ordinal regression analysis." Computer methods and programs in biomedicine 49.2 (1996): pp. 157-176.*

Law, James, and Gregg Rothermel. "Whole program path-based dynamic impact analysis." Proceedings of the 25th International Conference on Software Engineering. IEEE Computer Society, 2003. pp. 308-318.*

Austin, Todd M., and Gurindar S. Sohi. "Dynamic dependency analysis of ordinary programs." ACM SIGARCH Computer Architecture News. vol. 20. No. 2. ACM, 1992. pp. 342-351.*

Kadar et al., "Semantic-Based Extraction Approach for Generating Source Code Summary Towards Program Comprehension", 2015 9th Malaysian Software Engineering Conference, Dec. 2015, 6 pgs.

Mel et al., "The NIST Definition of Cloud Computing", NIST, Special Publication 800-145; Sep. 2011, 7 pgs.

* cited by examiner

IDENTIFYING SOFTWARE DEPENDENCY RELATIONSHIPS

BACKGROUND

The present disclosure relates to identifying dependency relationships in software and, more specifically, to methods and systems for automatically creating software dependency graphs.

Understanding complex software is a non-trivial task. Previously, static analysis has been applied to identify various relationships among source code elements, such as define-use relationships. However, traditional static analysis approaches are constrained by the programming language itself and cross function precision, do not scale well for very large source code, and cannot handle well missing source code. Modern systems are comprised of dozens of different programming languages further compounding the aforementioned problem. By its nature, static code analysis also only provides a snapshot of non-executing code and does not capture dynamic or execution time information.

Numerous tools exist for statically identifying source code dependencies for specific programming languages. These tools suffer from the above-described limitations, as well as provide a conservative analysis, resulting in numerous false dependencies and making it very difficult to identify any relevant dependencies.

SUMMARY

Embodiments include a computer-implemented method for identifying dependency relationships in a software product, the method includes obtaining change history data for the software product and extracting a plurality of change elements from the change history data, each change element including an identifier of a code segment that was changed and a timestamp of the change. The method also includes creating a dependency graph based on the plurality of change elements, wherein the dependency graph includes nodes that correspond to the code segments and edges that connect nodes that were both updated in a same logical grouping, calculating a weight for each of the edges based on probability that the nodes connected by the edge will be updated together, and outputting the dependency graph.

Embodiments include a computer system for identifying dependency relationships in software, the computer system having a processor, the processor configured to perform a method. The method includes obtaining change history data for the software product and extracting a plurality of change elements from the change history data, each change element including an identifier of a code segment that was changed and a timestamp of the change. The method also includes creating a dependency graph based on the plurality of change elements, wherein the dependency graph includes nodes that correspond to the code segments and edges that connect nodes that were both updated in a same logical grouping, calculating a weight for each of the edges based on probability that the nodes connected by the edge will be updated together, and outputting the dependency graph.

Embodiments also include a computer program product for identifying dependency relationships in software, the computer program product including a computer readable storage medium having computer readable program code embodied therewith. The computer readable program code including computer readable program code configured to perform a method. The method includes obtaining change history data for the software product and extracting a plurality of change elements from the change history data, each change element including an identifier of a code segment that was changed and a timestamp of the change. The method also includes creating a dependency graph based on the plurality of change elements, wherein the dependency graph includes nodes that correspond to the code segments and edges that connect nodes that were both updated in a same logical grouping, calculating a weight for each of the edges based on probability that the nodes connected by the edge will be updated together, and outputting the dependency graph.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for identifying dependency relationships in a software product are provided. In one or more exemplary embodiments, a source code dependency relationship graph, also referred to as a dependency graph, is created by computing the probability that changes to different code segments will be made together based on historical code management artifacts, such as defects, changes, fixes, and new features. In one embodiment, clusters of dependent and related source code components at various levels are identified and represented in dependency graphs. The dependency graphs are programming language independent and enable a highly granular cross function interaction view of the dynamic relationships between software code segments of the software product. In exemplary embodiments, the dependency graphs are created based on the history of changes to the software product. For example, by taking snapshots of the software product code through time, such as at different releases or development milestones, to build graph models and to monitor and discover new or decaying dependency relationships.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
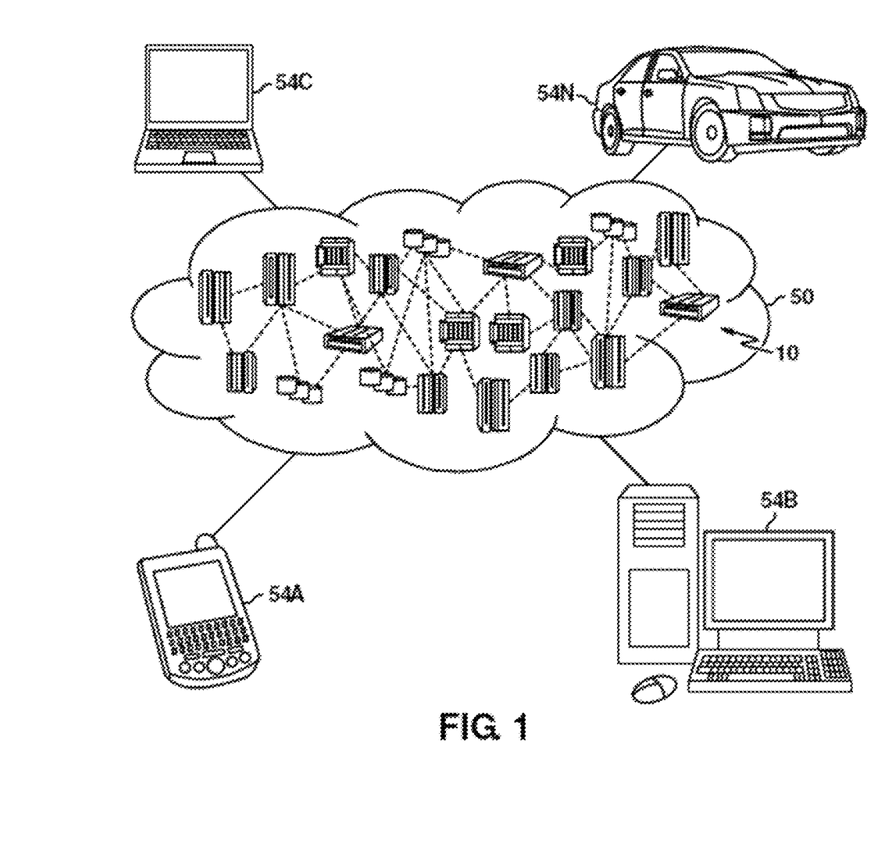
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
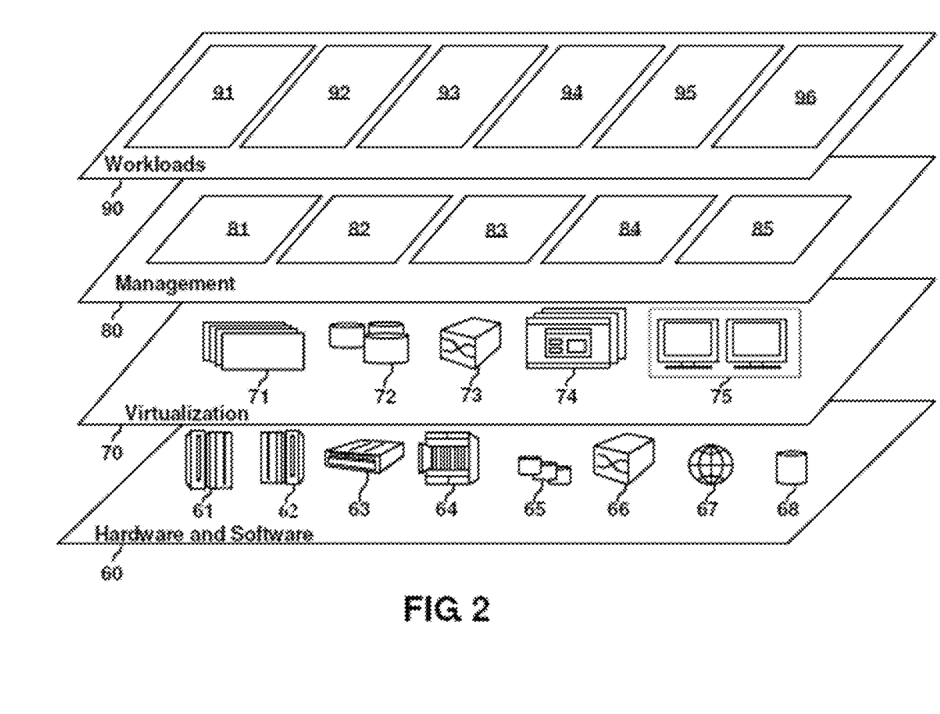
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software analysis 96.

Figure 3:
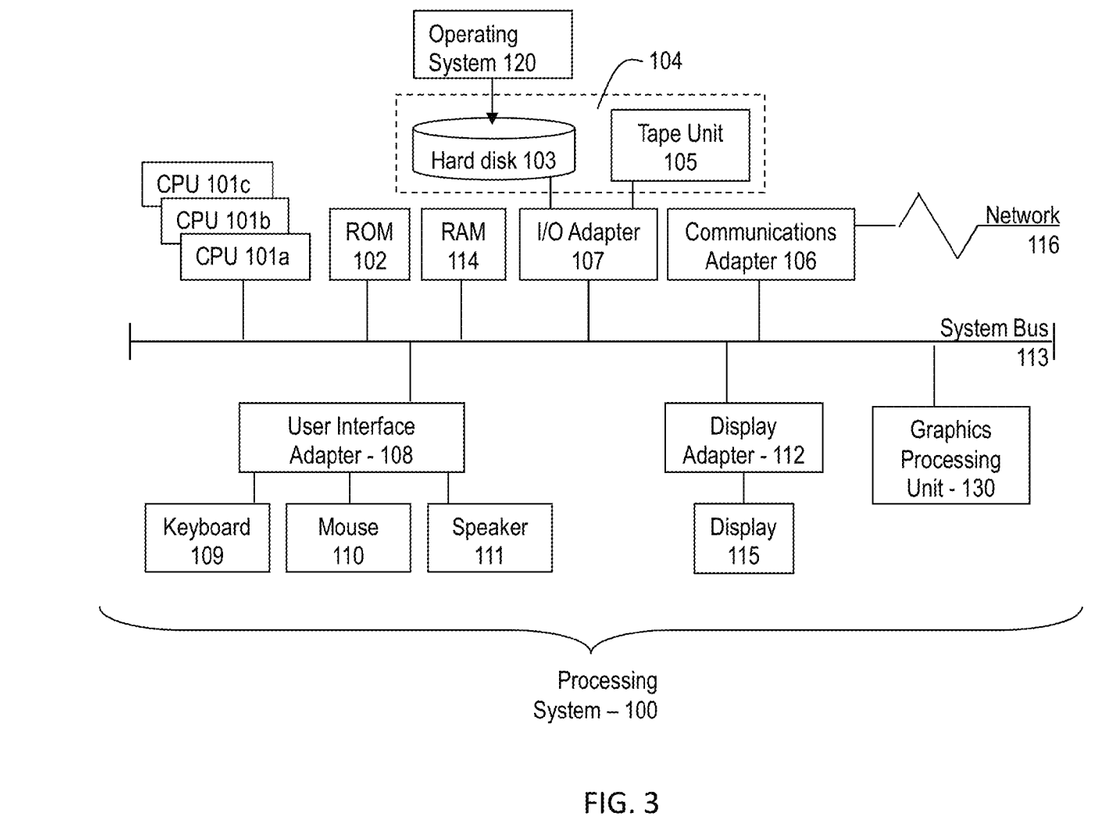
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
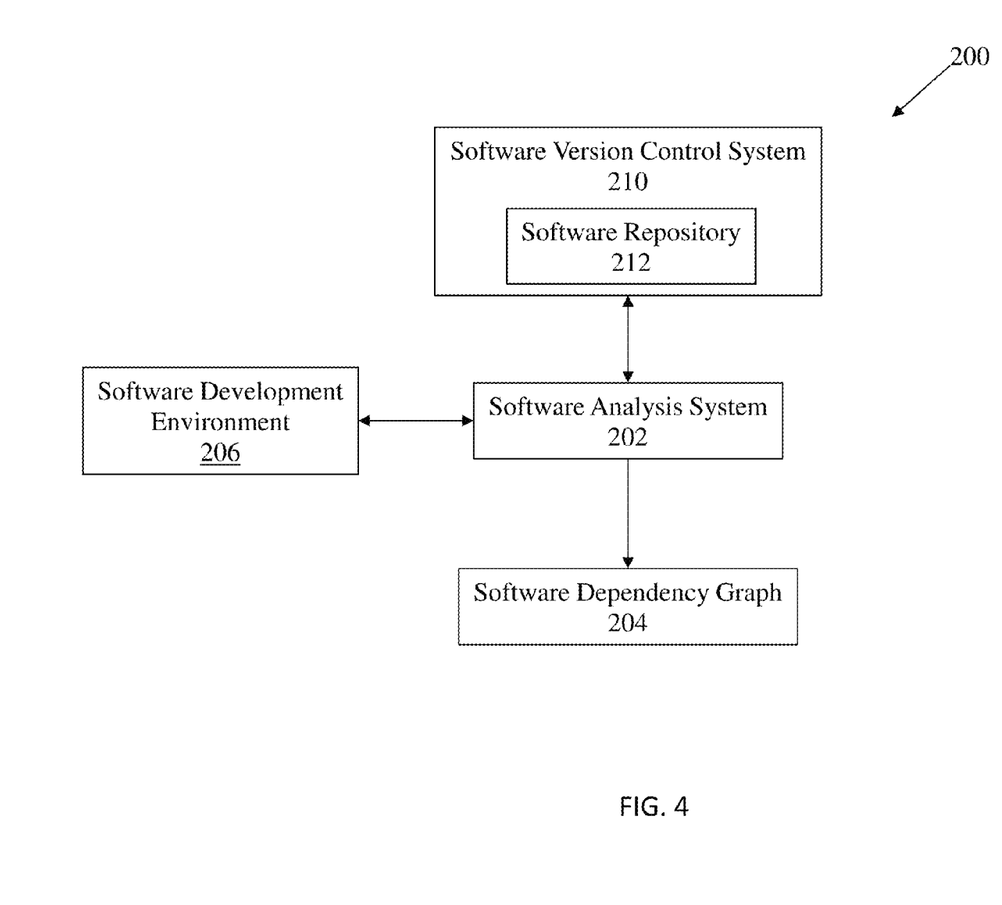
FIG. 4 illustrates a block diagram of a system for identifying dependency relationships in a software product in accordance with one or more embodiments.

Referring now to FIG. 4 there is shown a system 200 for identifying dependency relationships in a software product according to one or more embodiments. As illustrated, the system 200 includes a software analysis system 202, which may be embodied in a processing system such as the one shown in FIG. 3, which is in communication with a software version control system 210. In exemplary embodiments, the software analysis system 202 is configured to receive a change history for a software product from the version control system 210 and to analyze the change history to create and output a dependency graph 204 for the software product. In one embodiment, the version control system 210 maintains a software version repository 212 that can be used to obtain change history for the software product. The change history includes a plurality of change elements that each include an identifier of a segment of code that was changed and a date that the change was made. In addition, the change elements can also include additional information such as a change size, a reason for the change (e.g., feature, defect), an indication of the severity of the change, an indication of the impact of the change, or logical grouping identifier, such as a defect identifier.

In exemplary embodiments, the software analysis system 202 is configured to receive an update to a code segment from a software development environment 206 and to utilize the software dependency graph 204 to determine if the updated code segment is related to, i.e., dependent to or from, another code segment. Based on a determination that the updated code segment is related to another code segment, the software analysis system 202 is configured to provide an alert to a developer of the updated code segment of the related code segments.

Figure 5:
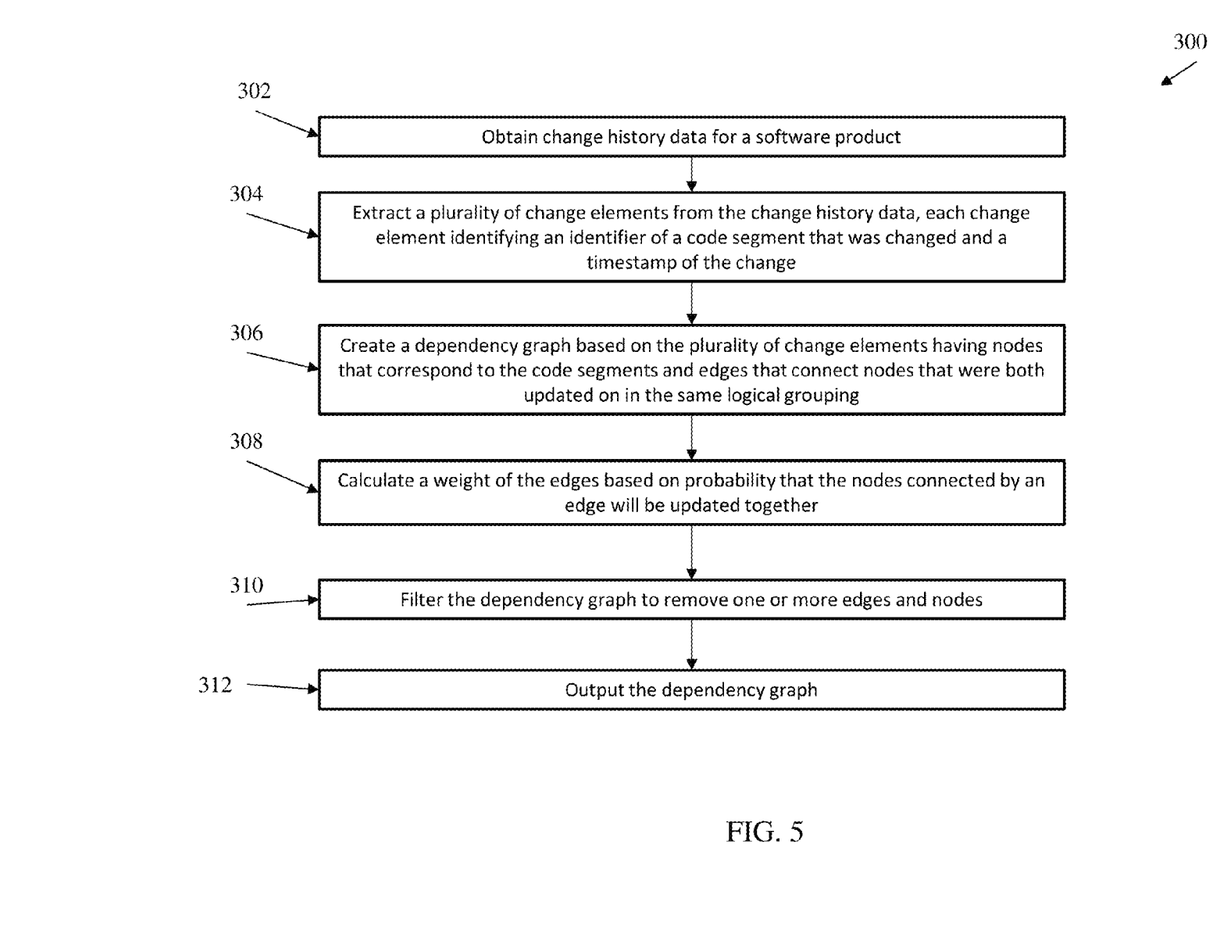
FIG. 5 illustrates a flow diagram of method for creating a dependency graph that illustrates dependency relationships in a software product in accordance with one or more embodiments.

Referring now to FIG. 5 there is shown a flow diagram of a method 300 for identifying dependency relationships in a software product according to one or more embodiments. As shown at block 302, the method 300 includes obtaining a change history data for the software product. In exemplary embodiments, the change history data is obtained from a version control system for the software product. Next, as shown at block 304, the method 300 includes extracting a plurality of change elements from the change history data, each change element includes an identifier of a code segment that was changed and a timestamp of the change. In exemplary embodiments, the change element also includes one or more of a change size, a reason for the change (e.g., feature, defect), an indication of the severity of the change, an indication of the impact of the change, or logical grouping identifier, such as a defect identifier. In various embodiments, the change elements may be created based on any code element granularity, such as source code files, classes, modules, functions, blocks, or lines of code.

Next, as shown at block 306, the method 300 includes creating a dependency graph based on the plurality of change elements, the dependency graph having nodes that correspond to the code segments and edges that connect nodes that were both updated at in the same logical grouping, i.e., at the same time. In one embodiment, a determination that both code segments were updated in the same logical grouping may be based on determining that the date of both code segments were changed is the same. In one embodiment, a determination that both code segments were updated at the same time may be based on determining that a time difference between timestamps of the changes of both code segments is less than a threshold amount, such as one hour, two hours, or the like. In exemplary embodiments, the edges may be directional edges or non-directional edges. The method 300 also includes calculating a weight of the edges based on the probability that the nodes connected by an edge will be updated together, as shown at block 308. For example, a probability that node A will be updated when node B is updated can be calculated by, (the number of times node A has been updated on the same date as B)/(the number of times node A has been updated). Various other factors could be used in calculating the weights of the edges including giving a higher weight to recent changes, giving more weight to more frequent changes, giving more weight to certain types of changes, giving more weight based on severity or impacts of defects, and any combination of the different possible weighing approaches or probability algorithms.

Next, as shown at block 310, the method 300 includes filtering the dependency graph to remove one or more edges and nodes. In exemplary embodiments, edges that have a weighting that falls below a threshold can be removed from the dependency graph. In exemplary embodiments, various graph analysis techniques may be applied such as connected components, strongly connected components, and graph densities. Next, as shown at block 312, the method 300 includes outputting the dependency graph. In exemplary embodiments, the dependency graph can be saved by the software analysis system, output to a display, and/or transmitted to a software development environment.

Figure 6:
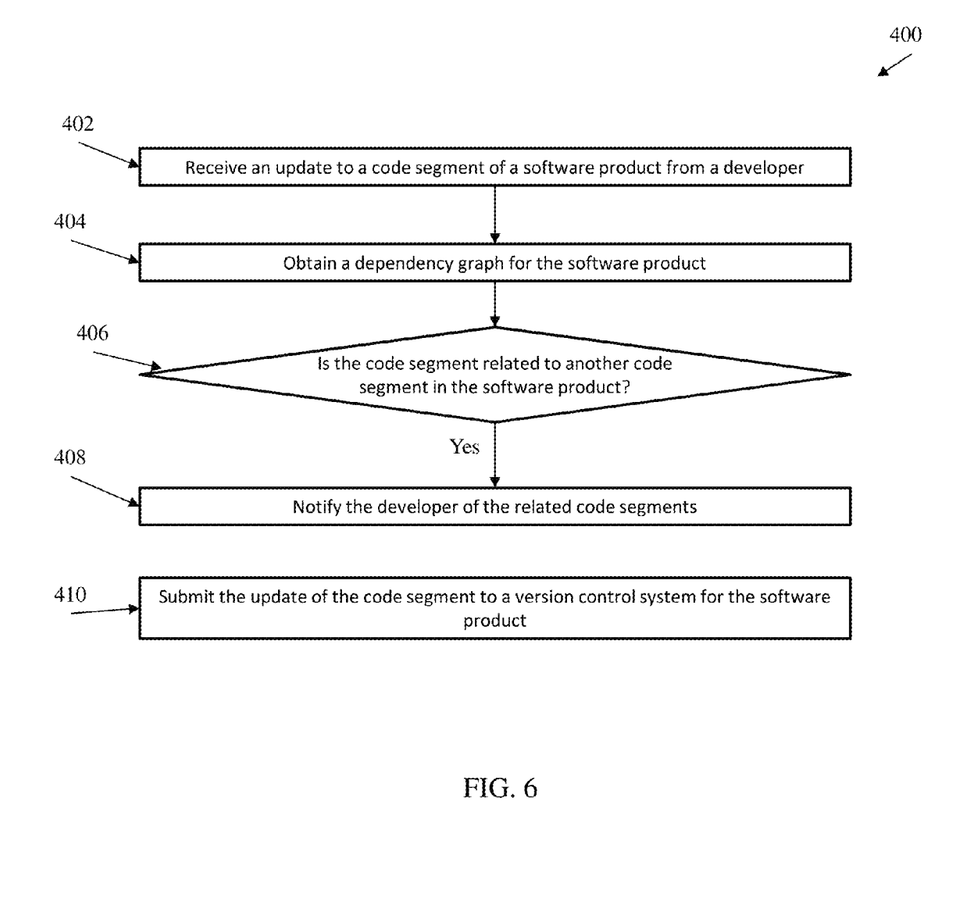
FIG. 6 illustrates a flow diagram of method for updating a software product using a dependency graph in accordance with one or more embodiments.

Referring now to FIG. 6 there is shown a flow diagram of a method 400 for updating a software product using a dependency graph according to one or more embodiments. As shown at block 402, the method 400 includes receiving an update to a code segment of a software product from a developer. In exemplary embodiments, the update to the code segment is received by the software analysis system from a software development environment. The method 400 also includes obtaining a dependency graph for the software product, as shown at block 404. Next, as shown at decision block 406, the method 400 includes determining if the code segment is related to another code segment in the software product. In exemplary embodiments, the determination that the code segment is related to another code segment in the software product is based on whether the node representing the code segment is connected to another node in the dependency graph by an edge that has a weight that exceeds a threshold value. If the code segment is related to another code segment in the software product, the method 400 proceeds to block 408 and includes notifying the developer of the related code segments. In exemplary embodiments, the notification includes sending an alert to the developer via the software development environment, where the alert includes an indication of the related code segments. If the code segment is not related to another code segment in the software product, the method 400 proceeds to block 410 and includes submitting the update of the code segment to a version control system for the software product.

Figure 7:
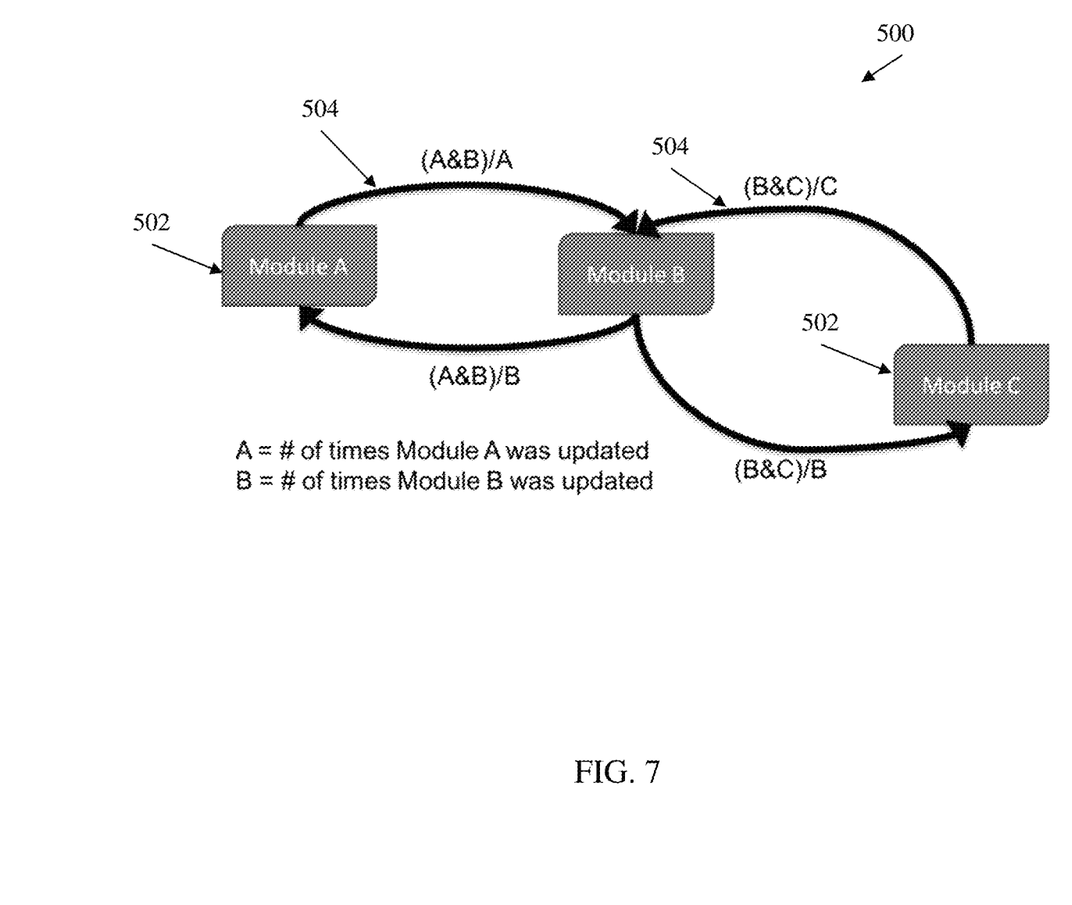
FIG. 7 illustrates a dependency graph in accordance with one or more embodiments.

Referring now to FIG. 7 there is shown a dependency graph 500 according to one or more embodiments. As illustrated, the dependency graph 500 includes a plurality of nodes 502 and a plurality of edges 504 that interconnect the nodes 502. In one embodiment, the dependency graph 500 is a directed graph and the edges 504 are assigned a weight by dividing the number of times that the two nodes were updated concurrently by the number of times that the source node was updated. In exemplary embodiments, various other weighting techniques or probability algorithms can be used as well.

In one embodiment, software designers can use the software dependency graph to interactively explore relationships between modules of a software product to ensure solution designs are complete. Designers can also restructure and refactor code based on complex relationships identified. In another embodiment, client support specialists can use the software dependency graph to explore relationships between modules of a software product while debugging a complex problem and can also request data to be captured from the failing and related components. In another embodiment, a software tester can use the software dependency graph to checks for relationships between modules of a software product in updated modules so that tests can be selected to drive coverage on module interactions as well as within a module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying dependency relationships in a software product, the method comprising:
   obtaining change history data for the software product;
   extracting, by a processor, a plurality of change elements from the change history data, each change element includes an identifier of a code segment that was changed and a timestamp of the change;
   creating, by the processor, a dependency graph based on the plurality of change elements, wherein the dependency graph includes nodes that correspond to the code segments and edges that connect nodes that were both updated in a same logical grouping, wherein the code segments in the same logical grouping have a timestamp of the change that are within a threshold value of one another;
   calculating, by the processor, a weight for each of the edges based on a probability that the nodes connected by the edge will be updated together; and
   based on a determination that the code segment is related to another code segment in the software product, notifying the developer of the related code, wherein the determination that the code segment is related to another code segment in the software product is based on one of the code segment depending from the another code segment and the another code segment depending from the code segment;
   outputting the dependency graph.

2. The method of claim 1 further comprising:
   receiving an update to a code segment of the software product from a developer;
   obtaining the dependency graph for the software product; and
   based on a determination that the code segment related to another code segment in the software product, notifying the developer of the related code segments.

3. The method of claim 1, wherein the calculating the weight for each of the edges further comprises assigning a higher weight based on a recency of the change to the code segments.

4. The method of claim 1, further comprising filtering the dependency graph to remove one or more edges and nodes by removing edges that have a weight that is less than a threshold value.

5. The method of claim 1, wherein the weight is further based on one or more of a size of the change, a reason for the change, a severity of the change, an impact of the change, and a logical grouping identifier associated with the change.

6. The method of claim 2, wherein the determination that the code segment related to another code segment in the software product is based on one of the code segment depending from the another code segment and the another code segment depending from the code segment.

7. The method of claim 6, wherein the code segment is determined to depend from another code segment based on the weight assigned to the edge connecting the nodes representing the code segments is above a threshold value.

8. A system for identifying dependency relationships in a software product, the system comprising:
a processor coupled to a memory, the processor configured to:
obtain change history data for the software product;
extract a plurality of change elements from the change history data, each change element includes an identifier of a code segment that was changed and a timestamp of the change;
create a dependency graph based on the plurality of change elements, wherein the dependency graph includes nodes that correspond to the code segments and edges that connect nodes that were both updated in a same logical grouping, wherein the code segments in the same logical grouping have a timestamp of the change that are within a threshold value of one another;
calculate a weight for each of the edges based on a probability that the nodes connected by the edge will be updated together; and
based on a determination that the code segment is related to another code segment in the software product, notifying the developer of the related code, wherein the determination that the code segment is related to another code segment in the software product is based on one of the code segment depending from the another code segment and the another code segment depending from the code segment;
output the dependency graph.

9. The system of claim 8, wherein the processor is further configured to:
receive an update to a code segment of the software product from a developer;
obtain the dependency graph for the software product; and
based on a determination that the code segment related to another code segment in the software product, notify the developer of the related code segments.

10. The system of claim 8, wherein calculating the weight for each of the edges further comprises assigning a higher weight based on a recency of the change to the code segments.

11. The system of claim 8, wherein the processor is further configured to filter the dependency graph to remove one or more edges and nodes by removing edges that have a weight that is less than a threshold value.

12. The system of claim 8, wherein the weight is further based on one or more of a size of the change, a reason for the change, a severity of the change, an impact of the change, and a logical grouping identifier associated with the change.

13. The system of claim 9, wherein the determination that the code segment related to another code segment in the software product is based on one of the code segment depending from the another code segment and the another code segment depending from the code segment.

14. The system of claim 13, wherein the code segment is determined to depend from another code segment based on the weight assigned to the edge connecting the nodes representing the code segments is above a threshold value.

15. A computer program product for identifying dependency relationships in a software product, the computer program product including a computer readable storage medium having computer readable program code embodied therewith, the computer readable program code including computer readable program code configured to perform a method, the method comprising:
receiving an update to a code segment of the software product from a developer;
obtaining change history data for the software product;
extracting a plurality of change elements from the change history data, each change element including an identifier of a code segment that was changed and a timestamp of the change;
creating a dependency graph based on the plurality of change elements, wherein the dependency graph includes nodes that correspond to the code segments and edges that connect nodes that were both updated in a same logical grouping, wherein the code segments in the same logical grouping have a timestamp of the change that are within a threshold value of one another;
calculating a weight for each of the edges based on probability that the nodes connected by the edge will be updated together; and
based on a determination that the code segment is related to another code segment in the software product, notifying the developer of the related code, wherein the determination that the code segment is related to another code segment in the software product is based on one of the code segment depending from the another code segment and the another code segment depending from the code segment;
outputting the dependency graph.

16. The computer program product of claim 15, wherein the calculating the weight for each of the edges further comprises assigning a higher weight based on a recency of the change of the code segments.

17. The computer program product of claim 15, wherein the method further comprises filtering the dependency graph to remove one or more edges and nodes by removing edges that have a weight that is less than a threshold value.

18. The computer program product of claim 15, wherein the code segment is determined to depend from another code segment based on the weight assigned to the edge connecting the nodes representing the code segments is above a threshold value.

* * * * *